(12) United States Patent
Kim et al.

(10) Patent No.: US 7,259,808 B2
(45) Date of Patent: Aug. 21, 2007

(54) LIQUID CRYSTAL DISPLAY ASSEMBLY COMPRISING FASTENERS FOR ATTACHING LCD PANEL AND BACKLIGHT TOGETHER TO A SUPPORT MEMBER

(75) Inventors: Young-Ho Kim, Seoul (KR); Ju-Seoub Kim, Seoul (KR); Kyung-Soo Suh, Seoul (KR); Ki-Sun Kim, Seoul (KR); Yong-Hun Seung, Seoul (KR); Kyu-Hun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 314 days.

(21) Appl. No.: 10/289,870

(22) Filed: Nov. 7, 2002

(65) Prior Publication Data

US 2003/0092471 A1 May 15, 2003

(30) Foreign Application Priority Data

Nov. 9, 2001 (KR) .............................. 2001-69845

(51) Int. Cl.
*G02F 1/1333* (2006.01)

(52) U.S. Cl. .......................... 349/58; 349/65; 349/60; 362/615; 362/633; 362/634

(58) Field of Classification Search ................ 349/153, 349/189, 190, 64, 65, 58, 113, 122, 62, 187, 349/112, 57, 60, 67, 69, 70; 362/609, 634, 362/611, 615, 632, 633
See application file for complete search history.

(56) References Cited

U.S. PATENT DOCUMENTS 5,844,166 A    12/1998 Halttunen et al.
5,999,238 A  * 12/1999 Ihara .......................... 349/58
6,163,310 A  * 12/2000 Jinno et al. .................. 345/87
6,304,308 B1   10/2001 Saito et al.
6,305,812 B1 * 10/2001 Kim et al. .................. 362/632
6,445,429 B1 *  9/2002 Moster et al. ................ 349/58
6,504,588 B1 *  1/2003 Kaneko ....................... 349/71
6,781,654 B2    8/2004 Kim et al.
6,933,994 B1 *  8/2005 Kaneko et al. ............. 349/112

(Continued)

FOREIGN PATENT DOCUMENTS

EP          1223726 A2     7/2002

(Continued)

*Primary Examiner*—Thoi V. Duong
(74) *Attorney, Agent, or Firm*—Lee, Hong, Degerman, Kang & Schmadeka (57) ABSTRACT

There is provided a liquid crystal display (LCD) assembly having a plurality of members, where the outer periphery of each member corresponds with the respective outer periphery of the other members, comprises a LCD panel and a liquid crystal injection member installed at a first edge of the LCD assembly for injecting liquid crystals. The LCD panel comprises upper and lower panels and liquid crystals are injected between the upper and lower panels through an injection area. The injection area is sealed in between the upper and lower panels to contain the injected liquid crystals. The LCD assembly further comprises a reflective plate for reflecting incident light, which is fastened to a backlight by one or more double-sided adhesive strips engaging one or more edges of the plate and backlight, other than the edges that correspond with the first edge of the injection area.

22 Claims, 8 Drawing Sheets

U.S. PATENT DOCUMENTS

2003/0092471 A1    5/2003    Kim et al.

FOREIGN PATENT DOCUMENTS

| JP | 10-244053 | * | 9/1998 |
| JP | 11-174979 | | 7/1999 |
| JP | 2000-056314 | | 2/2000 |
| JP | 2000-293309 | | 10/2000 |
| KR | 1020010061939 | | 7/2001 |

* cited by examiner

LIQUID CRYSTAL DISPLAY ASSEMBLY COMPRISING FASTENERS FOR ATTACHING LCD PANEL AND BACKLIGHT TOGETHER TO A SUPPORT MEMBER

CROSS-REFERENCE TO RELATED APPLICATIONS

Pursuant to 35 U.S.C. § 119(a), this application claims the benefit of earlier filing date and right of priority to the Korean Application No. 2001-69845, filed on Nov. 9, 2001, the content of which is hereby incorporated by reference herein in its entirety.

BACKGROUND OF THE INVENTION

1. Field of the Invention

The present invention relates to a liquid crystal display and, more particularly, to a liquid crystal panel that is less susceptible to damage as a result of external impact.

2. Description of the Related Art

Generally, a liquid crystal display is a display apparatus installed on an electronic appliance such as a mobile terminal, a monitor, or the like, and includes a pair of glass layers having electrodes, respectively, and liquid crystals, which are at an intermediate state between solid and liquid, injected between the glass layers so as to display character or image information by applying an electric field to electrodes.

Figure 1:
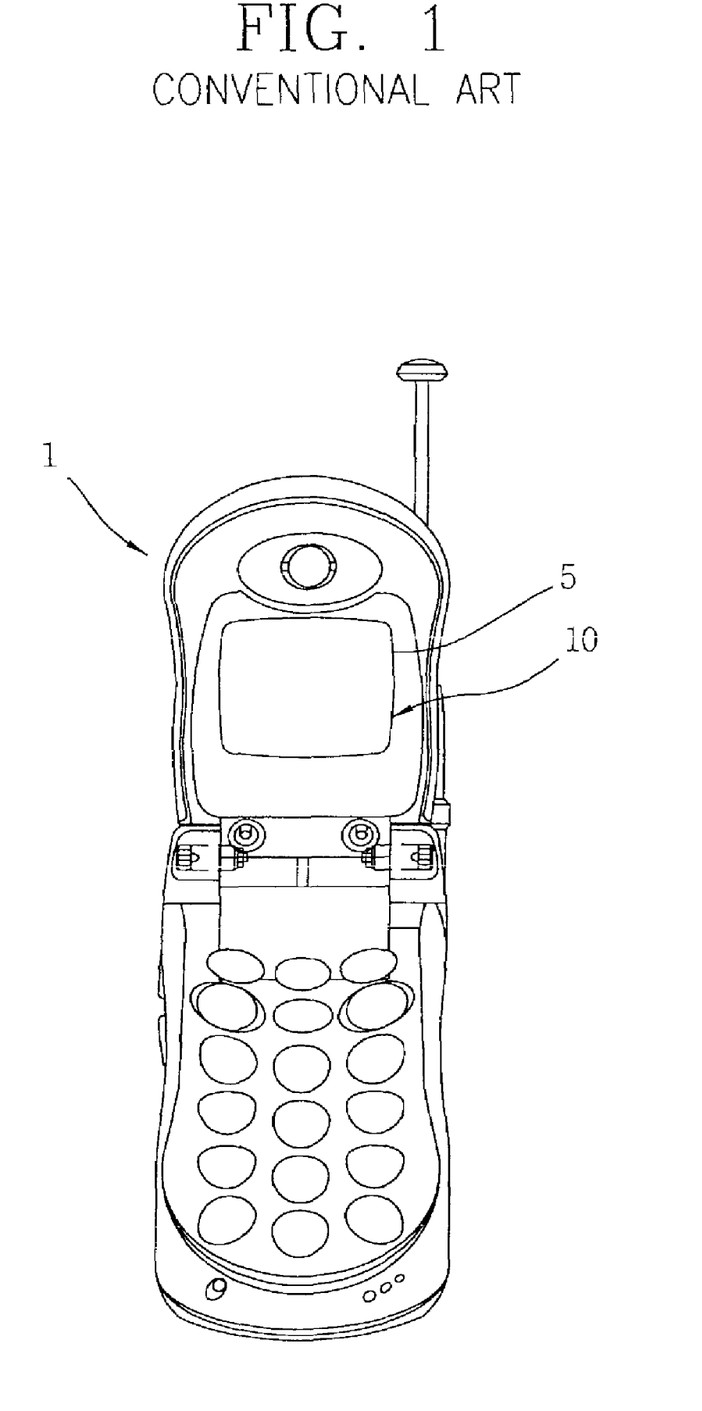
FIG. 1 illustrates a perspective view of a mobile terminal having a liquid crystal display.

Such a liquid crystal display can be installed on a folder type mobile terminal 1, as shown in FIG. 1, so as to display the status of the terminal or characters and image information. A liquid crystal panel includes a liquid crystal display 10, that typically fails to be self-luminescent. Hence, a backlight is installed at a rear side of the liquid crystal panel so that light emitted from the backlight allows characters or image information displayed on the liquid crystal panel to be more clearly displayed.

Backlights are mainly divided into (1) a direct type system shedding light on a front face of the liquid crystal panel, using electro-luminescence (EL) and (2) an edge type system shedding light on the liquid crystal panel using the light diffused through a light-guiding plate from a light source installed at one side or both sides of the liquid crystal panel. A liquid crystal display having the former backlight system is widely applied to small-sized electronic appliances such as mobile terminals.

Figure 2:
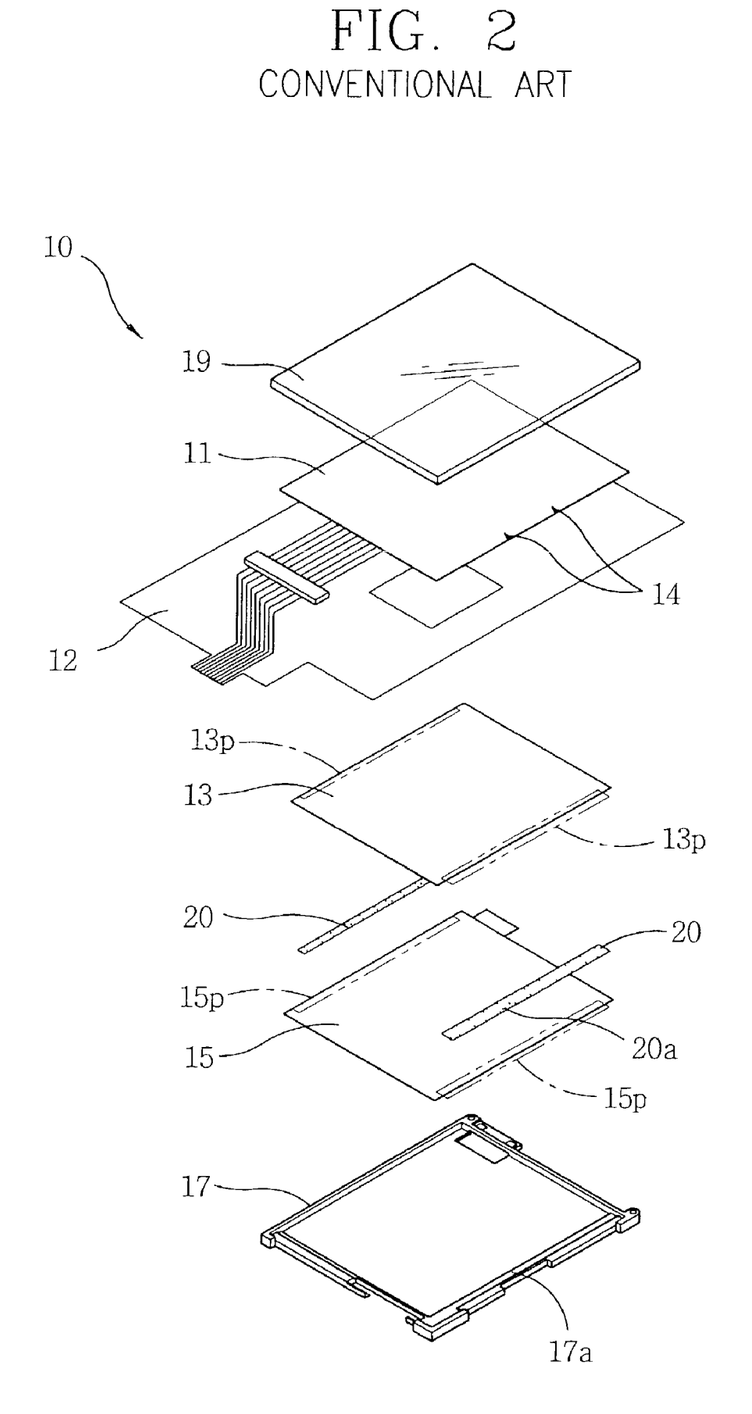
FIG. 2 illustrates an exploded perspective view of a liquid crystal display.

FIG. 2 illustrates an exploded perspective view of a liquid crystal display using a direct type backlight. A liquid crystal display 10 of a mobile terminal is installed in a frame 17 fixed inside a case (not shown) so as to display character or image information through a viewing window 5 (FIG. 1). The liquid crystal display 10 includes a liquid crystal panel 11 and a flexible print circuit (FPC) 12 connected to the liquid crystal panel 11 so that an output signal can be inputted thereto. A reflective plate 13 is attached in one body to a rear face of the liquid crystal panel 11 so as to reflect incident light.

A backlight 15 is placed at the rear face of the liquid crystal panel 11 to which the reflective plate 13 is attached so as to illuminate the flat liquid crystal panel 11. In this case, the reflective plate 13 transmits light emitted from the backlight 15 in the direction of the liquid crystal panel 11. The reflective plate 13 and the backlight 15 are attached to each other through a double-coated adhesive tape 20. Therefore, the liquid crystal panel 11, reflective plate 13, and backlight 15 are attached to each other in one body so as to constitute a liquid crystal panel assembly. The liquid crystal panel assembly is disposed in the frame 17.

The double-coated adhesive tapes 20 are attached respectively to both parts 13p and 15p between the reflective plate 13 and backlight 15 attached to the liquid crystal panel 11 in one body so as to maintain adhesiveness between the liquid crystal panel 11 and backlight 15 as well as not to interfere light irradiated from the backlight 15.

Figure 3:
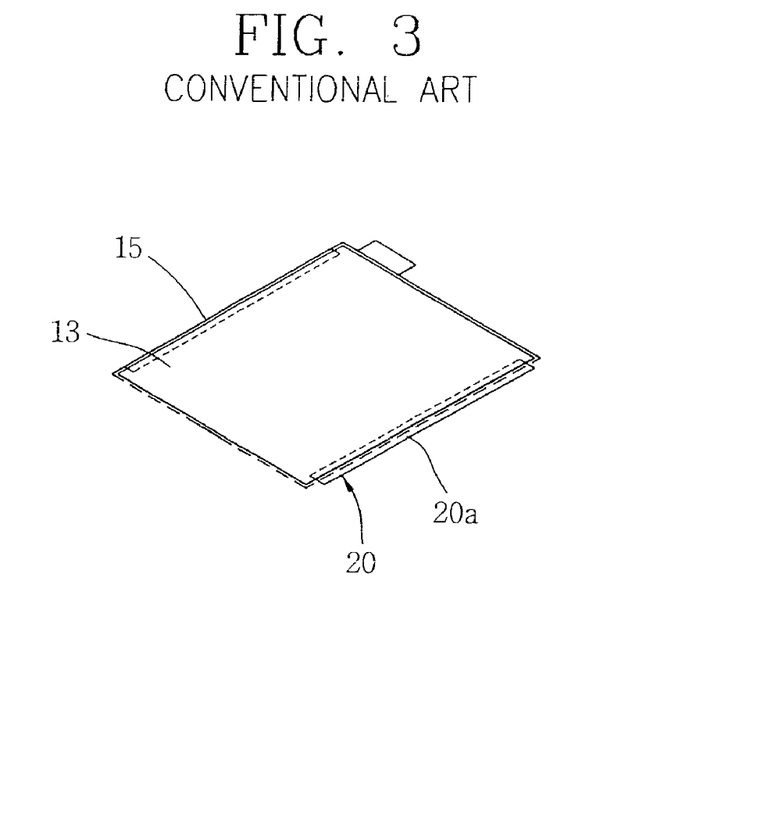
FIG. 3 illustrates a perspective view of a liquid crystal panel to which a backlight is attached.

The liquid crystal panel 11 has a liquid crystal injection part 14 sealed after the injection of liquid crystals between the two glass layers. The double-coated adhesive tapes 20 are attached to the edge portion of the liquid crystal injection part 14 and the opposite edge thereto, respectively. Portion 20a of one of the double-coated adhesive tapes 20, protrudes from the outer periphery of the backlight 15, as shown in FIG. 3, so as to attached to an inner face 17a of the frame 17 (shown in FIG. 2). The front side of the liquid crystal panel 11, as shown in FIG. 2, is covered with a polarizing plate 19 positioned so as to transmit the light that passes through the liquid crystal panel 11.

Since the double-coated adhesive tapes 20 are attached to the edge of the liquid crystal injection part 14, a gap is generated in the area where the injection part is formed. Unfortunately, as the result of an impact on the liquid crystal panel 11 (see FIG. 5), bleeding can occur at the gapped area so as to generate spots S (see FIG. 5). Due to the construction of the liquid crystal assembly, crystal injection part 14 disposed between reflective plate 13 and a polarized lens cover 19 (at area 14) is not sealed as strongly as the other edges of the assembly. As such, an impact to the assembly can cause severe bleeding in that area.

Figure 4:
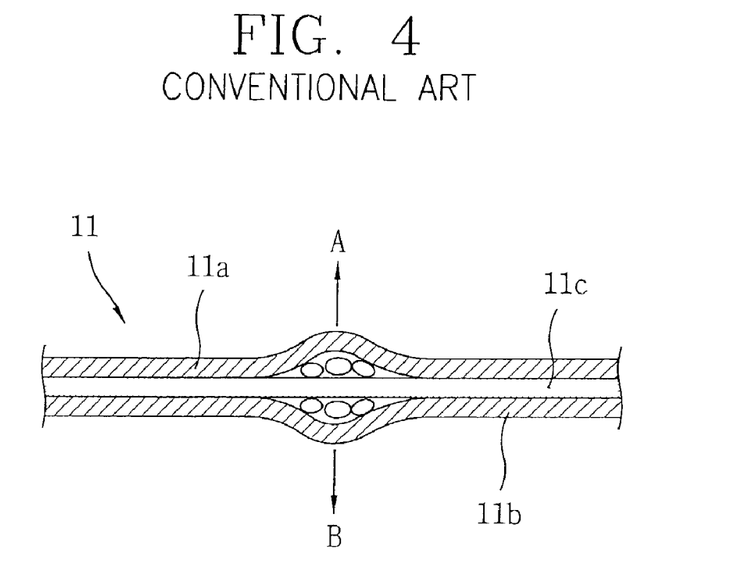
FIG. 4 illustrates a cross-sectional view of a liquid crystal display panel deformed.
Figure 5:
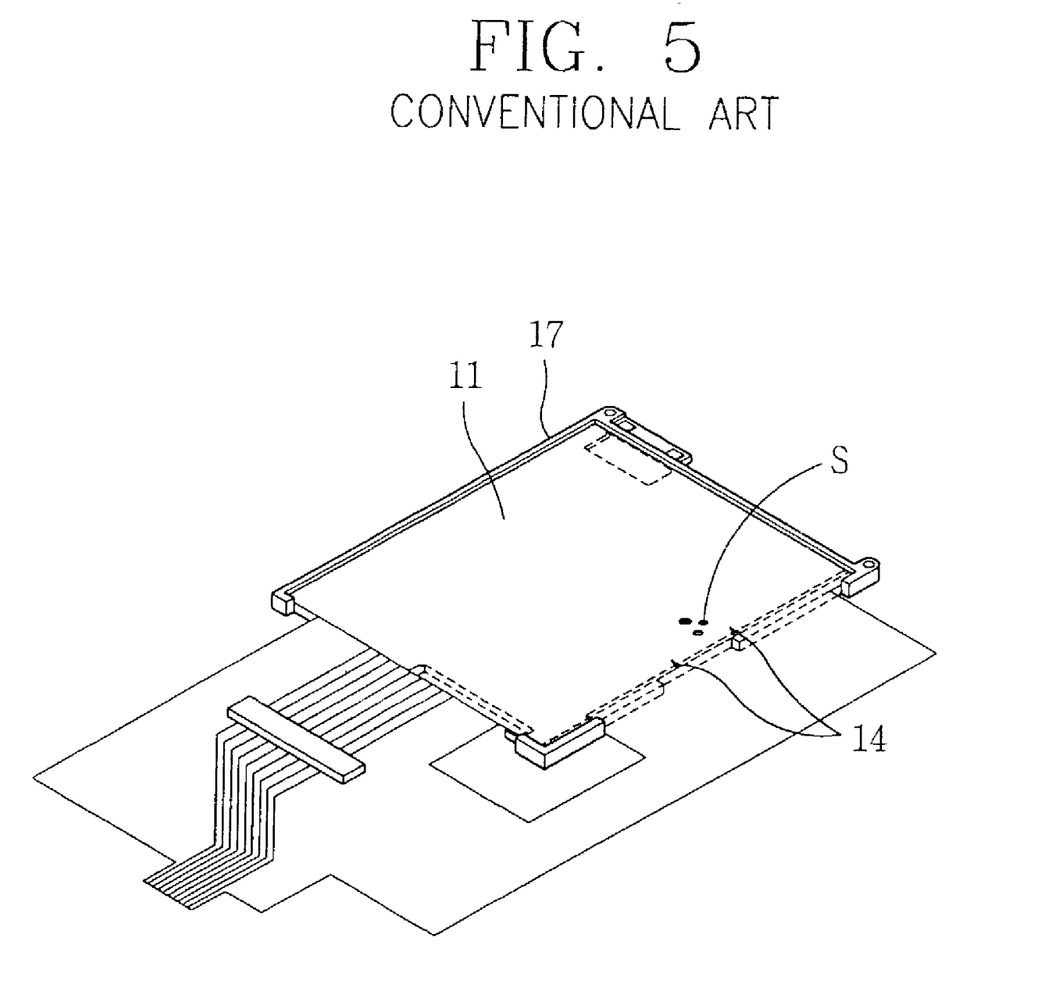
FIG. 5 illustrates a perspective view of a liquid crystal display showing bleeding resulted from an impact as spots S.

Referring to FIG. 4, the upper layer 11a and lower layer 11b, can be widened by an impact in directions A and B, respectively. Vacuum bubbles may form in the widened area from liquid crystals 11c filling a space between the layers 11a and 11b so as to bring about bleeding spots image or character information may be incorrectly displayed due to such bleeding. Mobile communication appliances such as mobile terminal are dropped often. Bleeding may worsen as the result of successive impacts, as shown in FIG. 5, at the part where the liquid crystal injection part 14 is located.

SUMMARY OF THE INVENTION

The present invention is directed to a liquid crystal display that can endure external impact without bleeding. Additional features and advantages of the invention will be set forth in the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display (LCD) assembly having a plurality of members stacked on top of each other, where the outer periphery of each member corresponds with the respective outer periphery of the other members, comprises a first member and a liquid crystal injection member installed at a first edge of the LCD assembly for injecting liquid crystals. The first member comprises upper and lower panels. Liquid crystals are injected in between upper and lower panels through an injection area. The injection area is sealed in between the upper and lower panels to contain the injected liquid crystals.

The LCD assembly further comprises a second member fastened to a third member by one or more fasteners engaging one or more edges of the second and third members, other than the edges that correspond to the first edge of the first member. According to an aspect of the present invention, the fasteners are made from adhesive material fixed in between the second and third members and may be double-sided adhesive strips, for example.

According to another aspect of the present invention, the third member may be a backlight for illuminating the first member. The backlight is preferably positioned under the second member. The second member may be a reflective plate for reflecting incident light. The reflective place is preferably positioned under the first member. The first member may be an LCD panel, for example, installable in a mobile terminal, such as a mobile telephone, or any other device using a flat panel screen, such as a video camera, digital camera, etc.

According to another aspect of the present invention, the one or more fasteners may engage the oppositely facing circumferential edges of the second and third members, except for the circumferential edge corresponding to the injection area of the first member. In addition, at least one portion of the adhesive material may protrude externally from in between the facing surfaces of the second and third members to the outer peripheries of the second and third members to attach the LCD assembly to a support member.

In another embodiment, there is provided a liquid crystal display (LCD) assembly comprising a LCD panel and a liquid crystal injection member installed at a first edge of the LCD assembly for injecting liquid crystals. The first member comprises upper and lower panels. Liquid crystals are injected in between upper and lower panels through an injection area. The injection area is sealed in between the upper and lower panels to contain the injected liquid crystals. There is also a reflective plate positioned below the lower panel and a backlight positioned below the reflective plate. The reflective plate is attached to the backlight by one or more fastening means attaching a first area on the lower surface of the reflective plate to a second area on the upper surface of the backlight.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Figure 6:
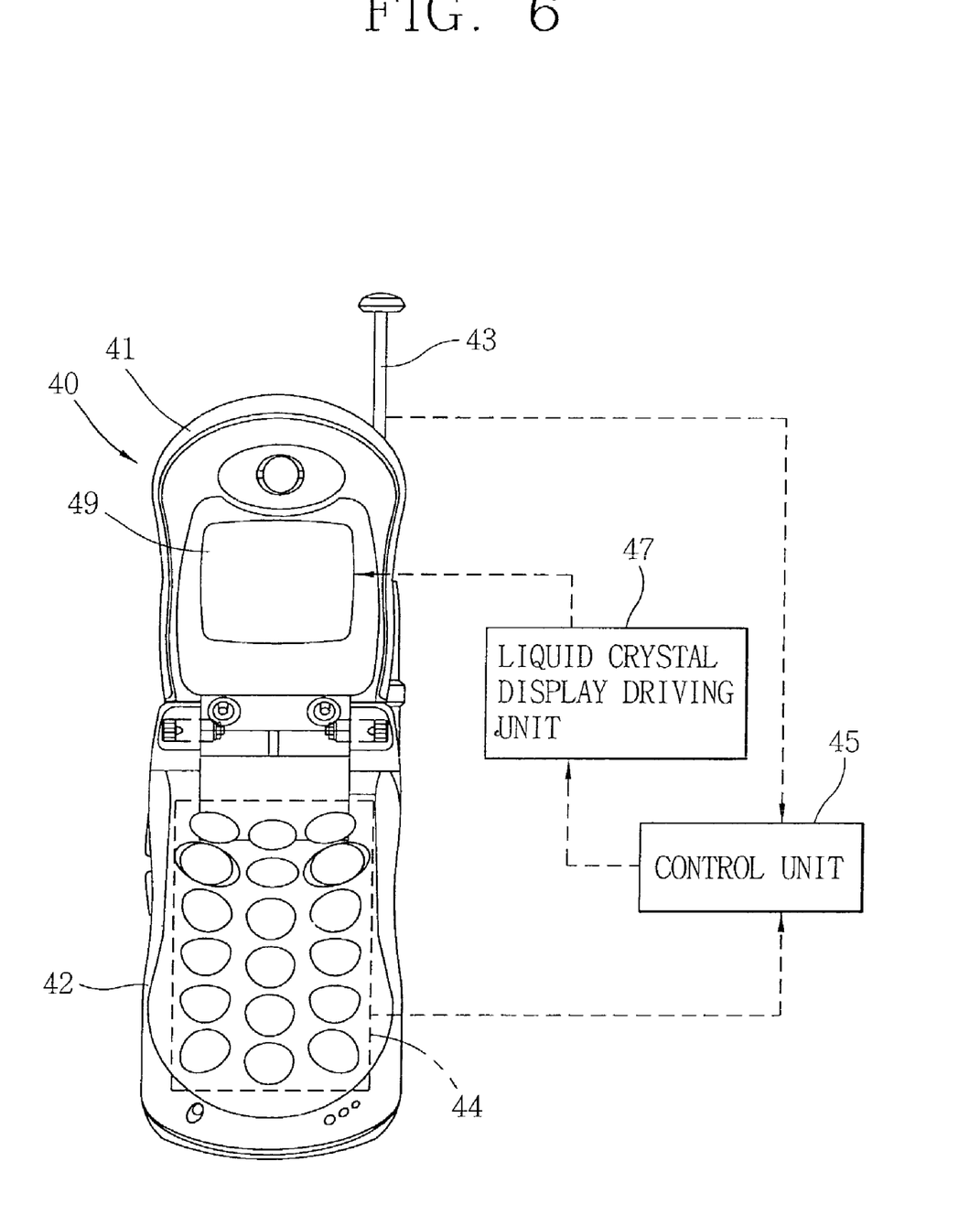
FIG. 6 illustrates a mobile terminal having a liquid crystal display according to an embodiment of the invention.

Referring to FIG. 6, a mobile terminal 40 comprises a transmitting/receiving unit 43 installed at a side of a folder unit 41, an input operating unit 44 disposed on the upper face of a body 42, so as to be operated by a user. Terminal 40 also comprises a control unit 45 connected to the transmitting/receiving unit 43, a liquid crystal display driving unit 47 and a liquid crystal display 49 installed on the folder unit 41. The liquid crystal display 49 is viewable when the folder unit 41 is in an open position.

It should be noted that one or more embodiments of the invention are described herein as applicable to a mobile terminal unit, such as a cellular communication telephone. This application, however, is by way of example and should not be construed to limit the scope of the invention to these particular embodiments. As such, the invention in other embodiments may be applicable to other devices incorporating a flat display panel, such as a digital cameras, video camcorders, etc.

Figure 7:
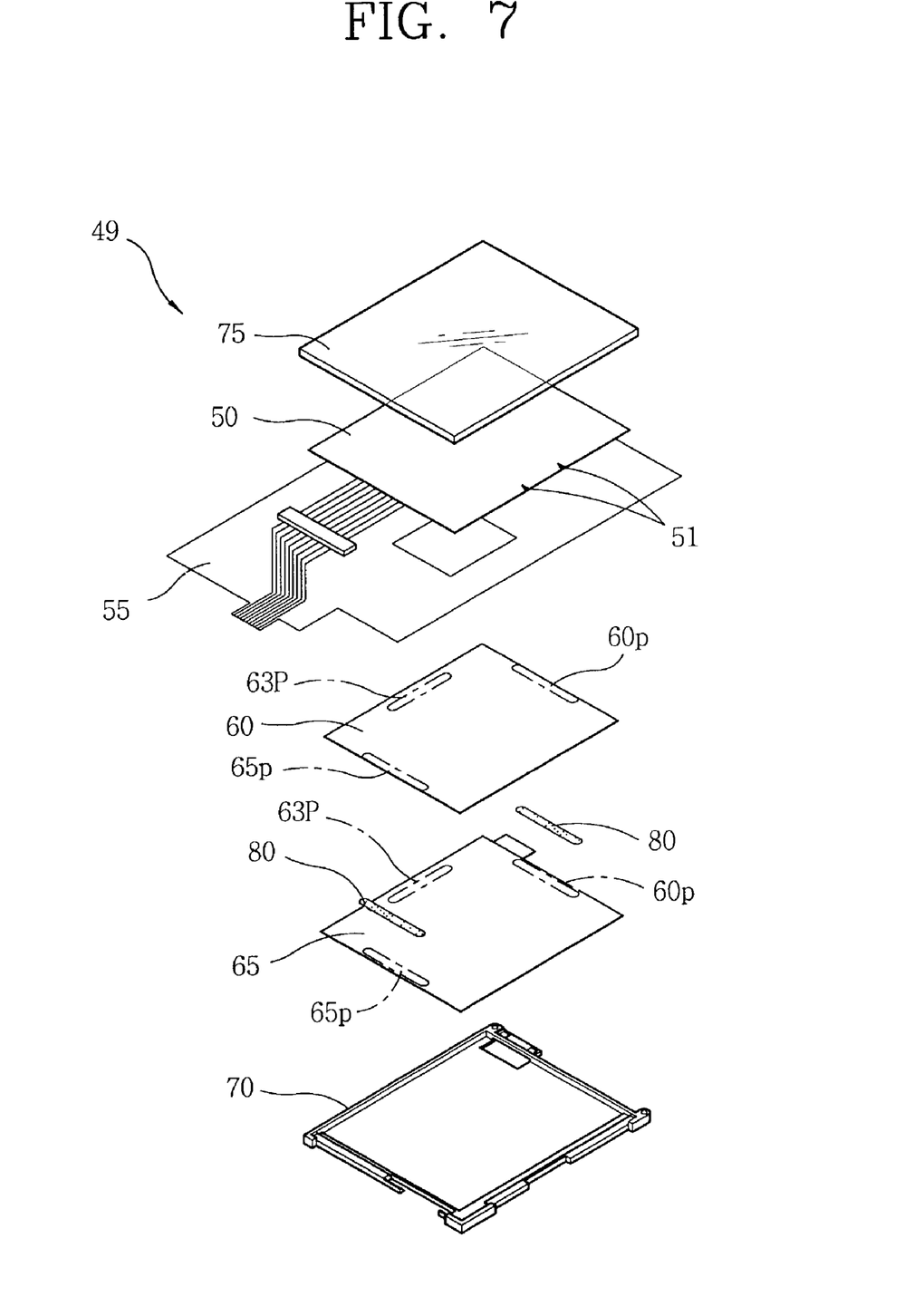
FIG. 7 illustrates an exploded perspective view of a disassembled liquid crystal display, according to an embodiment of the invention.
Figure 8:
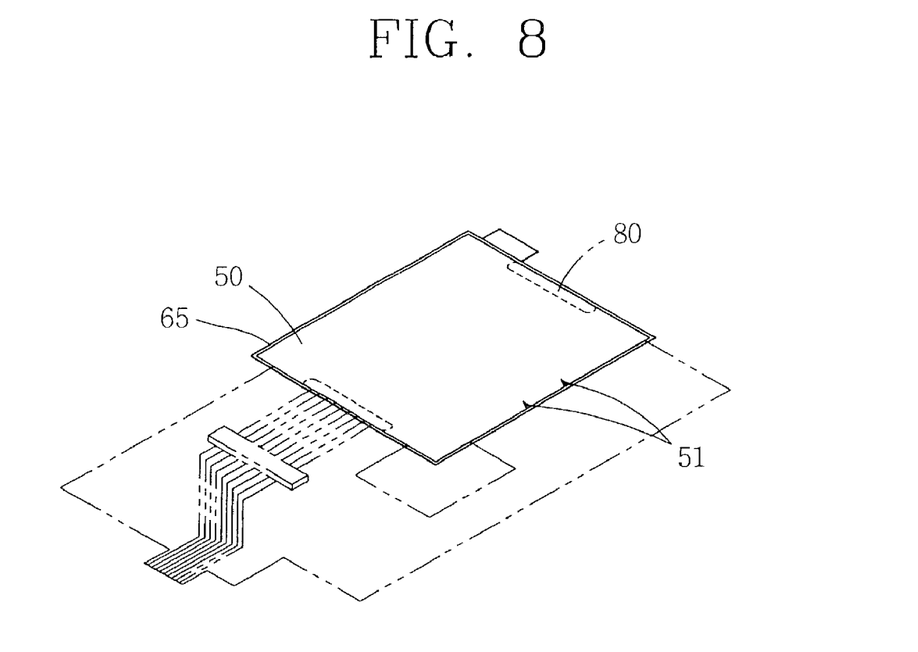
FIG. 8 illustrates a liquid crystal panel to which a backlight is attached, according to an embodiment of the invention.

Referring to FIG. 7, a liquid crystal display 49, according to an embodiment of the invention, is installed on a frame 70 fixed inside the folder unit 41, for example, so as to display character or image information through a viewing window of the folder unit 41. The liquid crystal display 49 includes a liquid crystal panel 50, for example, having a rectangular plane shape. A flexible printed circuit (FPC) 55 is connected to the liquid crystal panel 50 so as to receive an output signal from the liquid crystal display driving unit 47 (FIG. 6). A reflective plate 60 is attached, in one embodiment, to a rear side of the liquid crystal panel 50 so as to reflect incident light projected on the liquid crystal panel 50 toward the front side of the display.

At the rear side of the liquid crystal panel 50 to which the reflective plate 60 is attached, a backlight 65 having a rectangular shape, for example, is attached so as to light the liquid crystal panel 50. The oppositely facing surfaces of reflective plate 60 and backlight 65 constituting the rear side of the liquid crystal panel 50 are attached to each other via a pair of double-coated adhesive tapes 80, for example, as shown in FIG. 7. Other fastening means, such as adhesive substances (e.g., liquid, solid or plasma state glues, sealers and binders), may be utilized in other embodiments of the invention to attach reflective plate 60 and backlight 65. In other embodiments, fastening mechanisms such as bolts, screws and rivets may be used.

In one embodiment, the double-coated adhesive tapes 80 are attached, at least, to edges 60p and 65p between the reflective plate 60 and backlight 65 so as to attach the back light 65 to reflective plate 60, where liquid crystal injection part 51 is not present. In certain embodiments, an additional double-coated adhesive tape can be installed at an edge 63P opposite to the edge where the injection part 51 of the liquid crystal panel 50 is located. In some embodiments, the double-coated adhesive tapes are preferably installed at all edges except the edge where the injection part 51 of the liquid crystal panel 50 is presented.

In other embodiments, the double-coated adhesive tape can also be installed at the edge where injection part 51 is located except the portion where the injection part 51 of the liquid crystal panel 50 is positioned. Preferably, the double-coated adhesive tape is installed along the edge portion that does not correspond with the injection part 51.

In certain embodiments, the double-coated adhesive tape 80 is shorter than the length of the side of the liquid crystal panel 50 on which it is installed. Thus, the liquid crystal panel 50 including the reflective plate 60 and the backlight 65 are attached to each other via the double-coated adhesive tapes 80 so as to constitute a liquid crystal panel assembly. A polarizing plate 75 may be installed at the front side of the liquid crystal panel 50 so as to polarize light that passes through the liquid crystal panel 11.

Figure 9:
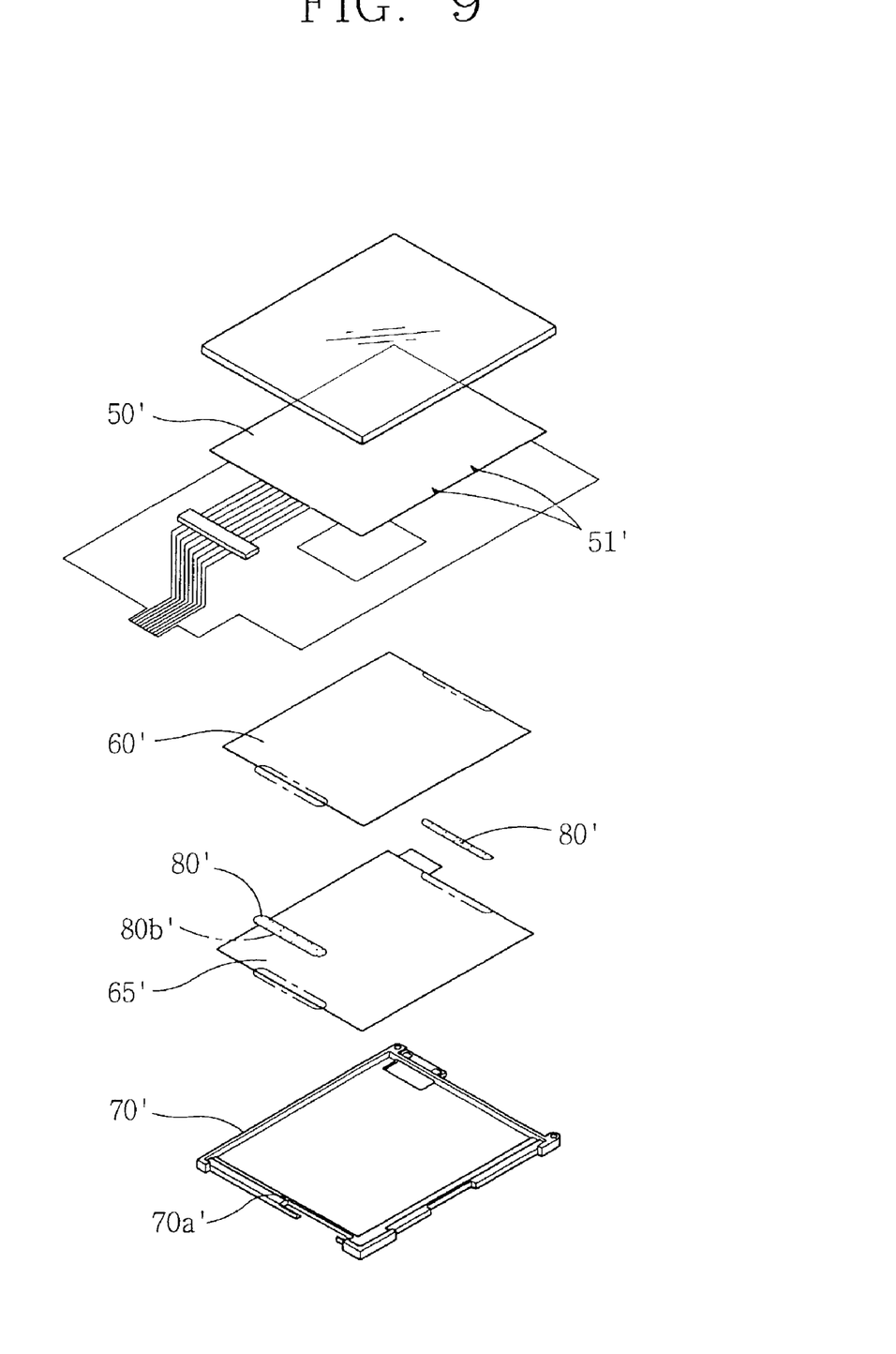
FIG. 9 illustrates an exploded perspective view of a disassembled liquid crystal display, according to another embodiment of the invention.
Figure 10:
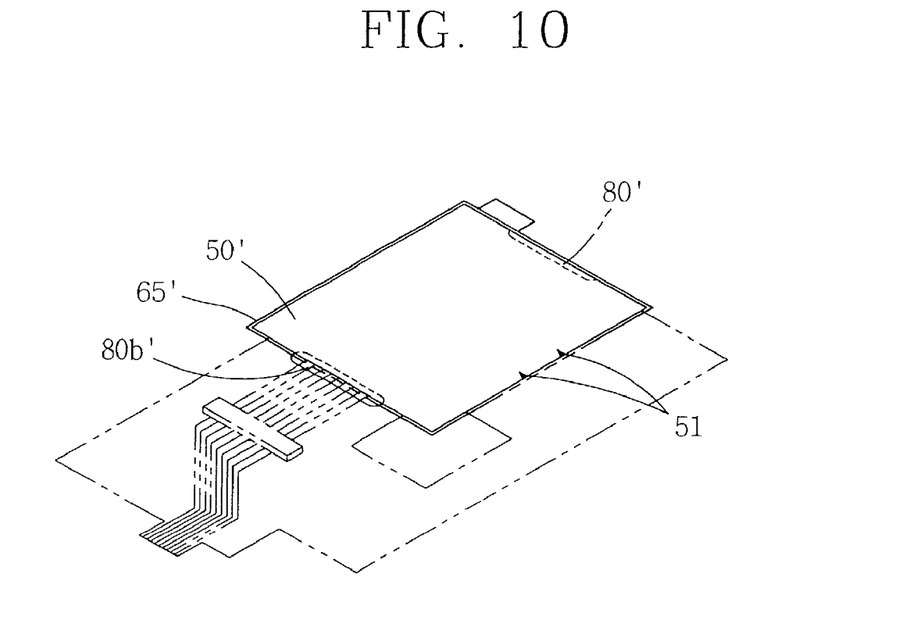
FIG. 10 illustrates a liquid crystal panel to which a backlight is attached, according to another embodiment of the invention.

Referring to FIGS. 9 and 10, in accordance with one embodiment of the invention, a reflective plate 60' is attached to the rear side of a liquid crystal panel 50' and a backlight 65' is attached to the rear side of the reflective plate 60' through a pair of double-coated adhesive tapes 80'. In this embodiment, the double-coated adhesive tapes 80' attached to edges do not overlap an injection part 51' of the liquid crystal panel 50'.

At least one of the double-coated adhesive tapes 80' includes a portion 80b' protruding externally from outer periphery of the liquid crystal panel 50' and backlight 65' so as to be attached to an inner surface 70a' of the frame 70'. The liquid crystal panel 50' and backlight 65 are attached to each other via the double-coated adhesive tapes 80', and the liquid crystal panel assembly is inserted and attached to the frame 70'.

In some embodiments, the double-coated adhesive tapes 80' are attached to the edges except to the part where the liquid crystal injection part 51' of the liquid crystal panel 50' is disposed. In this manner, the region where the liquid crystal injection part 51' is disposed becomes free from the double-coated adhesive tapes 80'.

Accordingly, in a liquid crystal panel as described above, the injection part is less vulnerable to external forces that may be exerted due to falling, thermal impact, or other pressure applied. Thus, the present invention prevents the upper and lower panels from being widened where the liquid crystal injection part is located, thereby preventing any bleeding from occurring in the liquid crystal panel.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A liquid crystal display (LCD) assembly having a plurality of members stacked on top of each other, the outer periphery of each member corresponding with respective outer periphery of the other members, the LCD assembly comprising:
   a first member comprising upper and lower panels;
   a liquid crystal injection member installed at a first edge of the first member for injecting liquid crystals in between said upper and lower panels through an injection area, wherein the injection area is sealed in between the upper and lower panels to contain the injected liquid crystals; and
   a second member fastened to a backlight for illuminating the first member by one or more fasteners engaging one or more edges of the second member and the backlight, other than the edges that correspond to the first edge of the first member, wherein at least one of the one or more fasteners does not substantially extend to intersections of at least one edge of the second member and the backlight that corresponds to the first edge of the first member,
   wherein the first member and the backlight are fastened to each other with fasteners engaging at least one edge of the first member except for the first edge of the first member, and each of the first member and the backlight are also fastened to at least one outward protrusion of a support member.

2. The LCD assembly of claim 1, wherein the fasteners are made from adhesive material fixed in between the second member and the backlight.

3. The LCD assembly of claim 2, wherein the fasteners are double-sided adhesive strips.

4. The LCD assembly of claim 1, wherein the first member is a LCD panel.

5. The LCD assembly of claim 1, further comprising a polarized polarizing panel positioned over the upper panel.

6. The LCD assembly of claim 1, wherein the second member is positioned under the first member.

7. The LCD assembly of claim 1, wherein the backlight is positioned under the second member.

8. The LCD assembly of claim 1, wherein the one or more fasteners engage the oppositely facing circumferential edges of the second member and back light, except for the circumferential edge corresponding to the injection area of the first member.

9. The LCD assembly of claim 8, wherein the outer peripheries of said plurality of members are approximately aligned with each other.

10. The LCD assembly of claim 1, wherein the support member is a frame installable in a mobile terminal.

11. A liquid crystal display (LCD) assembly comprising:
    a LCD panel comprising upper and lower panels;
    a liquid crystal injection member installed at a first edge of the LCD assembly for injecting liquid crystals between said upper and lower panels through an injection area, wherein the injection area is sealed in between the upper and lower panels to contain the injected liquid crystals;
    a second member positioned under the lower panel; and
    a backlight positioned under the second member;
    wherein the second member is attached to the backlight by one or more fastening means attaching a first area on lower surface of the second member to a second area on upper surface of the backlight, such that the first and second areas are not aligned with the first edge of the LCD assembly, wherein at least one of the one or more fastening means does not substantially extend to intersections of peripheral edges of the second member and the backlight, respectively,
    wherein at least one portion of the fastening means protrudes externally from in between oppositely facing surfaces of the second member and the backlight for attaching the LCD assembly to a support member.

12. The LCD assembly of claim 11, wherein the first and second areas comprise respective circumferential areas of oppositely facing surfaces of the second member and the backlight.

13. The LCD assembly of claim 11, wherein the first and second areas are comprised of respective circumferential areas of oppositely facing surfaces of the second member and the backlight, such that the first and second areas are not aligned with the injection area.

14. The LCD assembly of claim 11, wherein the support member is a frame installable in a mobile terminal.

15. The LCD assembly of claim 14, wherein the fastening means comprises of one or more double-sided adhesive strips.

16. A method for assembling a liquid crystal display (LCD) comprising:
   installing a liquid crystal injection member at a first edge of a LCD assembly for injecting liquid crystals between upper and lower panels of a LCD panel through an injection area;
   sealing the injection area;
   positioning a second member under the lower panel of the LCD panel;
   positioning a backlight under the second member; and
   attaching a first area on lower surface of the second member to a second area on upper surface of the backlight with one or more fasteners, such that the first and second areas are not aligned with the first edge of the LCD assembly, wherein at least one of the one or more fasteners does not substantially extend to intersections of peripheral edges of the second member and the backlight, respectively,
   wherein at least one portion of the fastening means protrudes externally from in between oppositely facing surfaces of the second member and the backlight to attach the LCD assembly to a support member.

17. The method of claim 16, wherein the first and second areas are comprised of respective circumferential areas of oppositely facing surfaces of the second member and the backlight.

18. The method of claim 16, wherein the first and second areas are comprised of respective circumferential areas of oppositely facing surfaces of the second member and the backlight, such that the first and second areas do not align with the injection area.

19. The method of claim 16, further comprising installing the support member in a mobile terminal.

20. The method of claim 16, wherein the one or more fasteners are double-sided adhesive strips.

21. The method of claim 16, further comprising positioning a polarizing panel over the upper panel of the LCD panel.

22. A liquid crystal display (LCD) assembly having a plurality of members stacked on top of each other, the outer periphery of each member corresponding with respective outer periphery of the other members, the LCD assembly comprising:
   a first member comprising upper and lower panels;
   a liquid crystal injection member installed at a first edge of the first member for injecting liquid crystals in between said upper and lower panels through an injection area, wherein the injection area is sealed in between the upper and lower panels to contain the injected liquid crystals; and
   a second member fastened to a third member by one or more fasteners engaging one or more edges of the second and third members, other than the edges that correspond to the first edge of the first member, wherein at least one of the one or more fasteners does not substantially extend to intersections of at least one edge of the third member that corresponds to the first edge of the first member,
   wherein the one or more fasteners engage the oppositely facing circumferential edges of the second and the third members, except for the circumferential edge corresponding to the injection area of the first member, and
   wherein at least one portion of the fasteners protrude externally from in between the outer periphery of the second and third members for attaching the LCD assembly to a support member.

* * * * *